US012546277B2

(12) United States Patent
Playle et al.

(10) Patent No.: US 12,546,277 B2
(45) Date of Patent: Feb. 10, 2026

(54) FLUID PUMP

(71) Applicant: PHINIA DELPHI LUXEMBOURG SARL, Belvaux (LU)

(72) Inventors: Andrew Playle, Sittingbourne (GB); Erol Kahraman, Maidstone (GB)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 101 days.

(21) Appl. No.: 18/290,204

(22) PCT Filed: May 12, 2022

(86) PCT No.: PCT/EP2022/062913
§ 371 (c)(1),
(2) Date: Nov. 10, 2023

(87) PCT Pub. No.: WO2022/238536
PCT Pub. Date: Nov. 17, 2022

(65) Prior Publication Data

US 2024/0352911 A1 Oct. 24, 2024

(30) Foreign Application Priority Data

May 12, 2021 (GB) ..................................... 2106766

(51) Int. Cl.
*F02M 55/04* (2006.01)
*F02M 59/46* (2006.01)

(52) U.S. Cl.
CPC ............ *F02M 55/04* (2013.01); *F02M 59/46* (2013.01); *F02M 59/466* (2013.01); *F02M 2200/50* (2013.01); *F02M 2200/502* (2013.01)

(58) Field of Classification Search
CPC ........... F02M 59/466; F02M 2200/502; F02M 2200/50; F02M 59/368; F02M 37/0023; F02M 55/04; F02M 59/46
See application file for complete search history.

(56) References Cited

U.S. PATENT DOCUMENTS 10,724,484 B2 * 7/2020 Pereira ............... F02M 63/0071
11,053,903 B2 * 7/2021 Kodama ............. F02M 59/366
(Continued)

FOREIGN PATENT DOCUMENTS

DE 102017202305 A1 8/2018
EP 2687713 A1 1/2014

OTHER PUBLICATIONS

International Search Report for PCT/EP2022/062913 dated Aug. 26, 2022, 4 pages.
(Continued)

*Primary Examiner* — Dominick L Plakkoottam
(74) *Attorney, Agent, or Firm* — WARNER NORCROSS + JUDD LLP

(57) ABSTRACT

An inlet valve assembly of a fluid pump comprises an inlet valve member movable between a closed position and an open position. In the closed position the inlet valve member is arranged to block a pump chamber inlet to prevent fluid from entering or exiting a pump chamber of the fluid pump through the pump chamber inlet. In the open position the inlet valve member is arranged to allow fluid to enter or exit the pump chamber through the pump chamber inlet. The inlet valve assembly further comprises a first biasing means configured to bias the inlet valve member in a first direction, $d_1$, towards the open position, when the inlet valve member is in the closed position; and a second biasing means configured to reduce the speed of the inlet valve member when the inlet valve member is moving in the first direction, $d_1$, towards the open position.

16 Claims, 4 Drawing Sheets

(56) References Cited

U.S. PATENT DOCUMENTS

| | | | | |
|---|---|---|---|---|
| 2003/0217713 | A1* | 11/2003 | Richardson | F01L 1/182 123/90.34 |
| 2015/0198126 | A1* | 7/2015 | Marechal | F04B 7/0076 251/336 |
| 2019/0051439 | A1* | 2/2019 | Langenbach | F16K 31/0693 |
| 2020/0080526 | A1* | 3/2020 | Kawano | F02M 59/368 |

OTHER PUBLICATIONS

Machine assisted English translation of DE102017202305A1 obtained from https://worldwide.espacenet.com/patent on Nov. 10, 2023, 13 pages.

* cited by examiner

FLUID PUMP

CROSS-REFERENCE TO RELATED APPLICATIONS

This application is the U.S. National Stage of International Application No. PCT/EP2022/062913 filed on 12 May 2022, which claims priority to and all advantages of United Kingdom Application No. 2106766.5 filed on 12 May 2021, the contents of which are incorporated herein by reference.

FIELD OF THE INVENTION

This invention relates to a fluid pump, in particular a fuel pump, for use in an internal combustion engine.

BACKGROUND

In common rail injection systems, fuel for injection into the internal combustion engine is stored in a central high pressure fuel reservoir known as a common rail. Fuel is supplied to the common rail from a fuel tank by means of a high pressure pump which is supplied with fuel from a low pressure supply pump (transfer pump). When required, fuel injectors coupled to the common rail deliver atomised fuel to the engine.

It is known to provide a metering valve at the inlet of a high pressure pump. The function of this metering valve is to meter fuel in a pumping chamber of the high pressure pump in order to match the high pressure fuel flow out of the high pressure pump as closely as possible to the fuel flow required at the fuel injectors.

The metering valve includes a valve member that engages with a valve seat to prevent flow of fuel out of the pumping chamber when in a closed position, and that is biased away from the valve seat by a spring in an open position. The valve member is held in its closed position by means of an energised solenoid that acts on an armature attached to the valve member. When the solenoid is de-energised, the valve member and armature move from the closed position towards the open position under the force of the spring, and those forces arising from the pressure differential across the metering valve, until the armature hits a mechanical stop.

The valve member can travel at high speeds when moving between its open and closed positions. When moving into the open position, the clash that occurs between the armature and the mechanical stop may result in impact damage to one or both of the armature and the mechanical stop. Furthermore, the high velocity profile of the components of the metering valve during movement from the open position to the closed position, and vice versa, can result in a number of further failures in the system, including but not limited to the following: cavitation damage to components of the valve and of the pump; dis-assembly of press-fit components of the valve and/or pump; undesirable noise, vibration and harshness (NVH) associated with the high velocity clash of components of the metering valve in use; impact damage to the valve seat, valve member, armature and/or mechanical stop: and valve bounce leading to unwanted fuel delivery on closure of the metering valve.

It is against this background that the invention has been devised.

SUMMARY OF THE INVENTION

According to an aspect of the invention there is provided an inlet valve assembly of a fluid pump of an internal combustion engine. The inlet valve assembly comprises an inlet valve member that is movable between a closed position and an open position. In the closed position the inlet valve member is arranged to block a pump chamber inlet to prevent fluid from entering or exiting a pump chamber of the fluid pump through the pump chamber inlet. In the open position the inlet valve member is arranged to allow fluid to enter or exit the pump chamber through the pump chamber inlet. The inlet valve assembly further comprises a first biasing means configured to bias the inlet valve member in a first direction, $d_1$, towards the open position, when the inlet valve member is in the closed position; and a second biasing means configured to reduce the speed of the inlet valve member when the inlet valve member is moving in the first direction, $d_1$, towards the open position.

The inlet valve assembly of the invention provides an arrangement in which movement of the inlet valve member from its closed position to its open position can be controlled so as to prevent, or at least reduce the impact of, clashes between components of the inlet valve assembly in use. In particular, the second biasing means is arranged to reduce the speed of the inlet valve member during at least a portion of its travel from the closed position to the open position. This advantageously guards against component clashes on opening of the inlet valve assembly, which may otherwise result in damage to the inlet valve assembly and/or the pump in which it is incorporated, and which may ultimately lead to reduced performance or even total failure of the inlet valve assembly over time.

The second biasing means may be configured to exert a force on the inlet valve member that acts in a second direction, $d_2$, opposed to the first direction, $d_1$, during at least a portion of travel of the inlet valve member from the closed position to the open position. The second biasing means may be configured to limit movement of the inlet valve member in the first direction, $d_1$.

The inlet valve assembly may comprise an armature that is attached to the inlet valve member such that movement of the armature causes movement of the inlet valve member. The second biasing means may be configured to bias the armature in the second direction, $d_2$, such that the inlet valve member attached to the armature is also biased in the second direction, $d_2$. In this way, the second biasing means may act to bias the inlet valve member in the second direction, $d_2$, via the armature.

By way of example, the armature may be suspended between the first biasing means and the second biasing means at all times.

By way of further example, the second biasing means may be in contact with the armature.

The armature may be generally cylindrical and comprise an opening in which the inlet valve member is received in a close fit. This close fit may define the attachment of the inlet valve member to the armature. Alternatively or additionally, the inlet valve member may be attached to the armature using any other appropriate attachment means or methods. Because the inlet valve member is attached to the armature, the inlet valve member moves with the armature at all times.

The armature may be housed in an armature-receiving chamber of the fluid pump. The second biasing means may be arranged at one end of the armature-receiving chamber. The second biasing means may extend from a floor of the armature-receiving chamber to one end of the armature when the inlet valve member is in the closed position.

When the inlet valve member is in the closed position, the second biasing means may be in a neutral state, under neither compression nor extension. Alternatively, the second biasing means may be compressed or extended when the inlet valve member is in the closed position. The second biasing means may be compressed when the inlet valve member is in the open position.

The second biasing means may be a progressive rate spring, which may have a spring rate that changes with compression of the spring. The second biasing means may be a wavy spring, a disc spring or a dome spring. The second biasing means may be arranged to surround a body of the inlet valve member.

The first biasing means may comprise a spring which may take the form of a helical or coil spring.

The inlet valve assembly may comprise a mechanical stop at the lower end of the armature-receiving chamber.

The inlet valve assembly may comprise a solenoid configured to exert a force on the armature that results in movement of the inlet valve member to the closed position.

According to another aspect the invention there is provided a fluid pump for an internal combustion engine. The fluid pump comprises: a pump chamber comprising a pump chamber inlet for receiving fluid into the pump chamber and a pump chamber outlet from which fluid can exit the pump chamber; and an inlet valve assembly according to any of the preceding paragraphs.

According to another aspect of the invention there is provided a method of operating an inlet valve assembly arranged at the inlet of a fluid pump for an internal combustion engine. The method comprises moving an inlet valve member in a first direction, $d_1$, from a closed position in which the inlet valve member is arranged to block a pump chamber inlet to prevent fluid from entering a pump chamber of the fluid pump, to an open position in which the inlet valve member is arranged to allow fluid to enter the pump chamber through the pump chamber inlet. The method comprises limiting movement of the inlet valve member in the first direction, $d_1$, by exerting a variable force on the inlet valve member that acts in a second direction, $d_2$, opposed the first direction, $d_1$, and increases as the inlet valve member moves in the first direction, $d_1$, to bring the inlet valve member to a controlled stop over a stopping distance.

Controlling and limiting movement of the inlet valve member during at least a portion of its movement from its closed position to its open position is advantageous to prevent, or at least reduce the impact of, clashes between components of the inlet valve assembly in use. In this way, the likelihood of damage to components of the inlet valve assembly and/or the pump caused by repeated collisions is reduced.

The variable force may be exerted by a progressive rate spring. The stopping distance may be in the range of 1 mm to 1.5 mm.

It will be appreciated that preferred and/or optional features of one aspect of the invention may be incorporated into the other aspect of the invention, alone or in appropriate combination.

BRIEF DESCRIPTION OF THE DRAWINGS

In order that the invention may be more readily understood, preferred non-limiting embodiments thereof will now be described, by way of example only, with reference to the accompanying drawings, in which.

Figure 1:
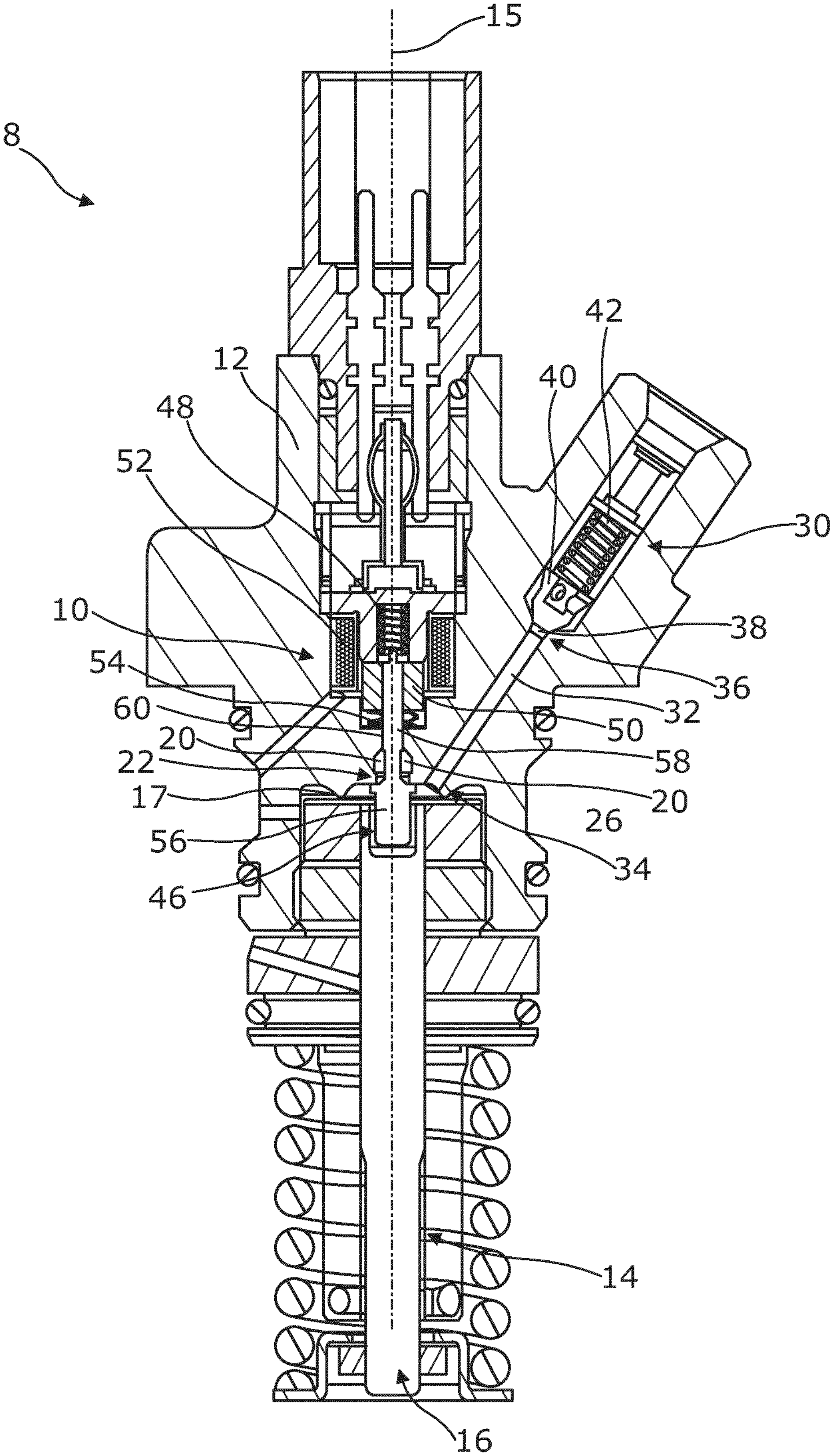
FIG. 1 is a schematic view of a high pressure pump element comprising an inlet valve assembly in accordance with the invention.

In the drawings, as well as in the following description, like features are assigned like reference signs.

SPECIFIC DESCRIPTION

FIG. 1 shows a high pressure pump element 8 for use in a fuel injection system of an internal combustion engine (not shown), and incorporating an inlet valve assembly 10 in accordance with an embodiment of the invention.

The high pressure pump element 8 pressurises and delivers fuel from a fuel tank (not shown) to a common rail (not shown) in which the pressurised fuel is stored. When required, fuel from the common rail is delivered to the engine via injectors in a well-known manner.

The pump element 8 comprises a pump housing 12 and a plunger bore 14 that extends along a longitudinal axis 15 of the pump element 8. The plunger bore 14 is configured to receive a plunger 16 that is moveable between a bottom-dead-centre position (hereinafter, "BDC position") and a top-dead-centre position (hereinafter, "TDC position"). Plunger motion is driven by means of a cam drive arrangement (not shown) including a cam and a tappet.

Figure 2:
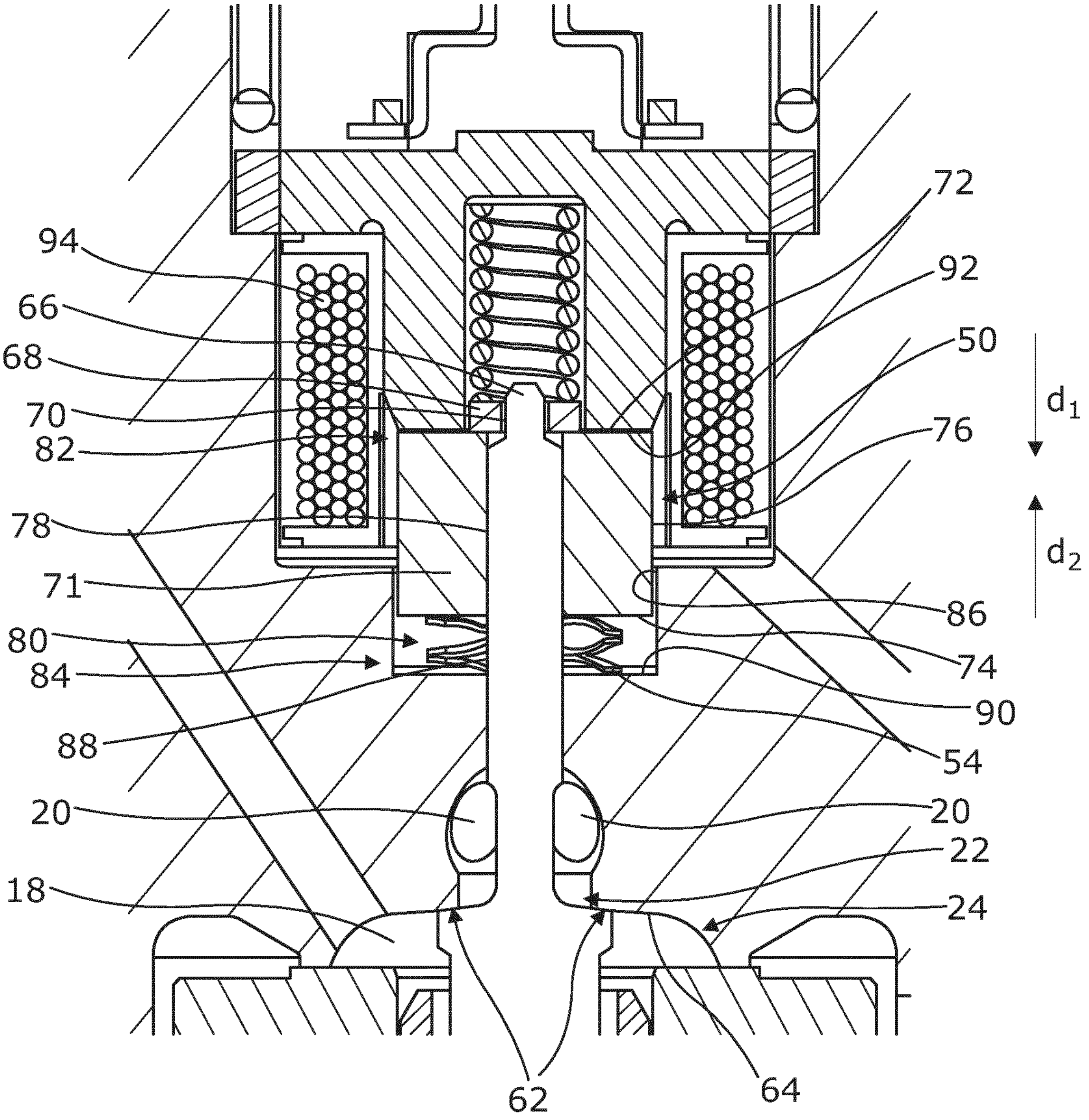
FIG. 2 is an enlarged cross sectional view of a portion of the high pressure pump element of FIG. 1 incorporating the inlet valve assembly which is shown in a closed position.

Referring also to FIG. 2, the plunger bore 14 and an upper surface 17 of the plunger 16 define a pump chamber 18 in which fuel is pressurised in use. Fuel is delivered to the pump element 8 from a low pressure pump (not shown) that draws fuel from the fuel tank, and enters the pump chamber 18 via inlet passages 20 (only two of which are shown in the cross section) and a pump chamber inlet region 22 provided at an upper end 24 of the pump chamber 18. Pressurised fuel exits the pump chamber 18 via a pump chamber outlet 26 also provided at the upper end 24 of the pump chamber 18. In practice there may be further inlet passages (e.g. four inlet passages) into the inlet region 22.

In use, reciprocal movement of the plunger 16 within the plunger bore 14 causes fuel within the pump chamber 18 to be pressurised. Specifically, movement of the plunger 16 during a pump stroke, in which the plunger moves from the BDC position to the TDC position, reduces the volume of the pump chamber 18 defined by the plunger bore 14 and the upper surface 17 of the plunger 16 such that the fuel within the pump chamber 18 is pressurised. Movement of the plunger 16 from the TDC position to the BDC position defines an intake or return stroke of the plunger 16, during which the volume of the pump chamber 18 increases and fuel is drawn into the pump chamber 18.

The pump element 8 further includes the inlet valve assembly 10 and an outlet valve assembly 30 which together control the flow of fuel through the pump element 8, and in particular out of the pump element 8.

The pump chamber 18 communicates with the outlet valve assembly 30 via an outlet passage 32 having a first end 34 positioned at the pump chamber outlet 26 and a second end 36 positioned at a pump outlet 38 from which fuel exits the pump element 8 via the outlet valve assembly 28.

The outlet valve assembly 30 includes an outlet valve member 40 and an outlet valve spring 42 that biases the outlet valve member 40 towards an opening that defines the pump outlet 38. The outlet valve assembly 30 is configured such that the outlet valve member 40 is moveable between a closed position and an open position. In the closed position the outlet valve member 40 blocks the pump outlet 38 and prevents fuel that has been pumped out of the pump element 8 through the pump outlet 38 from flowing back into the outlet passage 32 and the pump chamber 18. In the closed position the outlet valve member 40 also prevents the flow of fuel out of the pump element 8 through the pump outlet 38 and the outlet valve assembly 30. In the open position the pump outlet 38 is not blocked by the outlet valve member 40 and fuel can flow through the pump outlet 38 and the outlet valve assembly 30, and out of the pump element 8. When the outlet valve member is in the closed position, the outlet valve assembly 30 is closed. When the outlet valve member 40 is in the open position, the outlet valve assembly 30 is open.

When the fuel pressure within the pump chamber 18 exceeds a predetermined threshold level during the pump stroke, the outlet valve member 40 moves into the open position to allow pressurized fuel to flow out of the pump element 8. The outlet valve member 40 moves to the closed position to close the pump outlet 38 when the plunger 16 reaches the TDC position at the end of the pump stroke, and remains closed during the intake stroke.

The inlet valve assembly 10 is positioned at the pump chamber inlet region 22, and serves to control the supply of fuel to the pump chamber 18. The inlet valve assembly 10 also serves to control the flow of fuel out of the pump element 8, as the outlet valve assembly 30 will only open if the inlet valve assembly is in the closed position so as to prevent fuel flow back into the inlet region 22 from the pump chamber 18 during the pump stroke. As such, the inlet valve assembly 10 may be referred to as an outlet metering valve (OMV).

As best seen in FIG. 2, which shows an enlarged section of the pump element 8 of FIG. 1 and illustrates the inlet valve assembly 10 in a closed position, the inlet valve assembly 10 includes an inlet valve member 46, an inlet valve spring 48, an armature 50, a solenoid 52 and a damping spring 54. The inlet valve spring 48 defines a first biasing means of the inlet valve assembly 10, and the damping spring 54 defines a second biasing means of the inlet valve assembly 10.

The inlet valve member 46 comprises a head 56 and a generally cylindrical body 58. The body 58 of the inlet valve member 46 is received in an inlet valve bore 60 of the pump housing 12 that extends along the longitudinal axis of the pump element 8.

The inlet valve assembly 10 is configured such that the inlet valve member 46 is moveable between a closed position and an open position. In the closed position the inlet valve member 46 blocks the pump chamber inlet region 22 and prevents the flow of fuel both into and out of the pump chamber 18 through the pump chamber inlet region 22. In the open position, the pump chamber inlet region 22 is not blocked by the inlet valve member 46 and fuel can flow into and out of the pump chamber 18 through the pump chamber inlet region 22. When the inlet valve member 46 is in the closed position, the inlet valve assembly 10 is closed. When the inlet valve member 46 is in the open position, the inlet valve assembly 10 is open.

In the inlet region 22 to the pump chamber 18, the head 56 of the inlet valve member 46 engages with a valve seat 62 defined by an inner surface 64 of the pump chamber 18 in the closed position. In the open position (not shown), the head 56 of the inlet valve member 46 is separated from the valve seat 62.

The inlet valve spring 46 is mounted to a spring plate 68, and a tip region 66 of the inlet valve member 46 is received in and extends through an opening 70 in the spring plate 68.

The inlet valve spring 48 biases the inlet valve member 46 in a first direction, $d_1$, towards its open position. The inlet valve spring 48 must provide sufficient force to bias the inlet valve member 46 away from the valve seat 62 and into its open position during the pump stroke if required to prevent undesired flow of fuel out of the pump element 8 through the outlet valve assembly 30. The inlet valve spring 48 takes the form of a helical spring in this embodiment, but is not intended to be limited in this regard. It will be understood by a person skilled in the art that other types of springs or biasing means may be used in place of or in addition to a helical spring.

The armature 50 comprises a generally cylindrical body 71 having an upper face 72, a lower face 74 and an outer surface 76. An armature opening 78 (herein referred to as the armature bore) extends through a longitudinal axis of the armature 50 that aligns with the longitudinal axis 15 of the pump element 8 when the inlet valve assembly 10 is arranged in the pump element 8. The armature bore 78 extends from the lower face 74 of the armature 50 to the upper face 72 of the armature 50 to define a generally cylindrical through-hole. In use, the inlet valve member 46 is received in the armature bore 78 such that the armature 50 forms a collar that surrounds a portion of the inlet valve member 46. The armature bore 78 is dimensioned to receive the body 58 of the inlet valve member 46 in a close, interference fit, to secure or attach the inlet valve member 46 to the armature 50. In this way, movement of the armature 50 results in movement of the inlet valve member 46, and vice versa.

The armature 50 is housed in an armature-receiving chamber 80 of the pump housing 12 that surrounds the inlet valve bore 60. The chamber 80 is generally cylindrical in shape and comprises an upper end 82 and a lower end 84. The chamber 80 is dimensioned such that a small clearance exists between the outer surface 76 of the armature 50 and an inner side surface 86 of the chamber 80 to allow the armature 50 to move within the chamber 80 between a first, or open, position and a second, or closed, position. The closed position of the armature is illustrated in FIGS. 1 and 2. In its closed position, a small clearance exists between the upper face 72 of the armature 50 and an upper surface 92 of the chamber 80 to ensure that the inlet valve member 46 can reach its closed position and properly seal against the valve seat 62 when the armature is in its closed position. In the open position of the armature 50 (not shown), the upper face 72 of the armature 50 is separated from the upper surface 82 of the chamber 80, and the inlet valve member 46 is in its open position.

The damping spring 54 is provided at the lower end 84 of the chamber 80. As will be explained in more detail later, the damping spring 54 acts to dampen movement of the armature 50, and thus of the inlet valve member 46, at least during part of its movement 50 from the closed position to the open position.

In this embodiment, the damping spring 54 is a linear spring. As is known, a linear spring has a spring rate (i.e. the force required to compress a spring by a millimetre) that is constant with compression of the spring.

In other embodiments the damping spring 54 may take the form of a wavy or wave spring, also known as a coiled wave spring. As is known, a wavy spring is formed of a coiled flat wire into which waves are added to provide a spring effect, and the stiffness of a wavy spring can be selected by the choice of various parameters of the spring, such as the wire size, the form of the wire, the number of turns in the spring, the turn configuration, the number of waves in the spring, and the form of the waves. A wavy spring is appropriate for use as the damping spring 54 due to its high stiffness and small deflection range (i.e. short travel) which provides the required damping effect to movement of the armature 50, as will be explained later. As is also known, a progressive rate spring has a spring rate that changes progressively with compression of the spring. Thus, as a progressive rate spring compresses, it becomes stiffer and more difficult to compress further.

It should be understood that in other embodiments the damping spring 54 may take other different forms. For example, the damping spring 54 may comprise a spring washer, such as a dome spring or a disc spring, both of which also have high stiffness and a small deflection range.

A disc spring or washer, sometimes known as a Belleville or conical spring or washer, comprises a metal plate that defines a generally frusto-conical shell. Individual disc washers can be used on their own, or multiple disc washers may be stacked for form a spring stack. Disc washers of a spring stack may be stacked in the same orientation, in alternating orientations, or in more complicated stacking patterns. The spring constant of a spring stack of disc washers can be adjusted by adjusting the number of stacked washers and their orientations.

A dome spring or washer comprises a metal plate that defines a dome. Rounded outer surfaces of the dome extend outwardly and downwardly from an opening at a top end of the washer.

More generally, the damping spring 54 may take the form of any type of biasing means having the required stiffness and small deflection range to sufficiently dampen movement of the armature 50 and inlet valve member 46.

The damping spring 54 has a generally circular profile when viewed from above, and defines a central cylindrical opening 88 which is dimensioned to receive the body 58 of the inlet valve member 46. When positioned in the inlet valve assembly 10 in the pump 8, the inlet valve member 46 extends through the opening 88 of the damping spring 54 as best illustrated in FIG. 2. In the embodiment of FIGS. 1 and 2, the opening of the damping spring 54 is dimensioned such that the damping spring 54 surrounds the body 58 of the inlet valve member 46 in a relatively close fit. This prevents lateral movement of the damping spring 54 within the chamber 80, and helps to retain the damping spring 54 in position in use. However, it is preferable to maintain at least a small radial clearance between the inlet valve member 46 and the damping spring 54 so as to prevent abrasion between the two components during opening and closing of the inlet valve assembly 10. Furthermore, in some embodiments the opening 88 of the damping spring 54 may be dimensioned to provide a more substantial gap between the body 58 of the inlet valve member 46 and the damping spring 54.

Referring still to FIG. 2, the damping spring 54 is positioned between the armature 50 and a floor or lower surface 90 of the chamber 80. In this embodiment, the damping spring 54 extends from the lower surface 90 of the chamber 80 to the lower face 74 of the armature 50 when the inlet valve assembly is in both its open and its closed positions. In this way, the damping spring 54 spans the gap between the armature 50 and the lower surface 90 of the chamber 80, and generally remains in contact with the lower surface 90 of the chamber 80 and the lower face 74 of the armature 50 at all times in use. Thus, the armature is suspended between the inlet valve spring 48 and the damping spring 54 at all times when assembled in the pump element 8 to create a floating armature arrangement. This arrangement is preferable, as it allows for movement of the armature 50 to be controlled by the damping spring 54 along its full range of travel between its closed and open positions. However, it would be possible for the damping spring 54 to only partially span the gap between the lower surface 90 of the chamber 80 and the lower face 74 of the armature 50 in the closed position of the inlet valve assembly, in which case the damping spring 54 would still control movement of the armature 50 during at least a final portion of its travel from the closed position to 35 the open position. In that case, the damping spring 54 may be secured to the lower surface 90 of the chamber 80 so as to retain it in position in the chamber 80 during use.

In the present embodiment the damping spring 54 is not secured to either the armature 50 or the lower surface 90 of the chamber 80, but in general the damping spring 54 may be secured to one or both of the armature 50 and the lower surface 90 of the chamber 80, for example using an adhesive or any other appropriate attachment means or methods.

The solenoid 52, which comprises a plurality of coils 94 through which electric current can be passed to generate a magnetic field in a well known manner, is arranged to surround at least a portion of the armature 50 in both the open and closed positions of the inlet valve assembly 10.

During the intake stroke in which the plunger 16 of the pump moves from the TDC position to the BDC position, the solenoid 52 is de-energised such that the inlet valve assembly 10 is open. Fuel is drawn into the pump chamber 18 through the inlet passage 20. The outlet valve assembly 30 is closed.

To close the inlet valve assembly 10 the solenoid 52 is energised or activated such that an electric current flows through the coils 94 of the solenoid 52, as will be described.

The point at which the solenoid 52 is energised to close the inlet valve assembly 10 will depend on the fueling requirements of the engine to which the fuel is ultimately delivered on exiting the pump element 8.

For example, in a low load condition of the engine when less fuel is required, the solenoid 52 may be energised part way through the pump stroke, such that the inlet valve assembly 10 is open during at least a portion of the pump stroke. In this way, fuel is allowed to spill back through the inlet valve assembly 10 and prevented from flowing out of the outlet valve assembly 30 during at least a portion of the pump stroke, thus avoiding delivery of excess unrequired fuel to the engine.

In a higher load condition of the engine when more fuel is required, the solenoid 52 may be energised to close the inlet valve assembly 10 earlier in the pump stroke, or directly at the end of the intake stroke (i.e. at the start of the pump stroke) to enable pressurised fuel to exit the pump element 8 and be delivered to the engine throughout the entirety of the pump stroke.

Once the inlet valve assembly 10 is closed during the pump stroke, the solenoid 52 may be de-energised such that the flow of current through its coils 94 is discontinued and the magnetic field generated by the solenoid 52 is terminated, but the inlet valve assembly 10 remains in its closed position due to pressure in the pump chamber 18 during the pump stroke.

During the pump stroke, the outlet valve assembly 30 is initially closed. Fuel in the pump chamber 18 is pressurised as the plunger 16 moves from the BDC position towards the TDC position with the inlet valve assembly 10 closed. When the pressure in the pump chamber 18 reaches a pre-determined threshold value, the outlet valve member 40 is pushed into its open position against the biasing force of the outlet valve spring 42 and fuel exits the pump chamber 18. The outlet valve member 40 moves to its closed position to close the pump outlet 38 when the plunger 16 reaches the TDC position at the end of the pump stroke, and the pump cycle begins again.

As noted already, to close the inlet valve assembly 10 the solenoid 52 is energised or activated such that an electric current flows through the coils 94 of the solenoid 52. This generates a magnetic field that acts to pull the armature 50 into its closed position against the biasing force of the inlet valve spring 48.

The inlet valve spring 48 is in a first compressed state when the inlet valve assembly 10 is in the closed position. The damping spring 54 is in a neutral state, i.e. under neither extension nor compression, when the inlet valve assembly 10 is in its closed position in this embodiment. In this way, the damping spring 54 does not exert a force on the armature 50 in the closed position. In other embodiments, the damping spring 54 may be in a slightly extended state or in a slightly compressed state in the closed position of the inlet valve assembly 10, so long as the net force on the armature 50 when the solenoid 52 is energised results in the armature 50 being pulled to and held in its closed position.

The inlet valve member 46 and the armature 50 are both in their respective closed positions when the inlet valve assembly 28 is closed. In their closed positions, a small clearance exists between the upper face 72 of the armature 50 and the upper surface 92 of the chamber 80, and the head 56 of the inlet valve member 46 is engaged with the valve seat 62 to block the pump chamber inlet region 22. Flow of fuel from the inlet passages 20 into the pump chamber 18 and from the pump chamber 18 into the inlet passages 20 via the pump chamber inlet region 22 is thereby prevented.

At the end of the pump stroke, with the solenoid 52 de-energised and the inlet valve assembly 10 in the closed position, the inlet valve spring 48 pushes the armature 50 in the first direction, $d_1$, towards the open position. Initially, the damping spring 54 exerts no force on the armature 50, as the damping spring 54 is in a neutral state when the armature 50 is in the closed position. However, as the armature 50 moves towards the open position under the force of the inlet valve spring 48, the damping spring 54 undergoes compression, absorbing kinetic energy of the armature and acting to decrease the velocity of the armature 50. Under compression, the damping spring 54 exerts a force on the armature 50 in a second direction, $d_2$, that is opposed to the first direction, $d_1$.

As the armature 50 moves from its closed position towards a fully open position, the plunger 16 moves from its TDC position towards its BDC position. The hydraulic forces resulting from this downwards movement of the plunger 16, which causes fuel to be drawn into the pump chamber 18 through the partially open inlet valve assembly 10, also act to urge the armature 50 downwards, towards its fully open position, during the intake stroke. The armature 50 continues to move in the first direction, $d_1$, until all of the forces exerted on the armature 50 by the inlet valve spring 48, the damping spring 54, movement of the plunger 16 during the intake stroke, and by virtue of the pressure differential across the inlet valve assembly 10 between the inlet region 22 and the pump chamber 18, are balanced, and the net force on the armature 50 is zero. These forces that affect opening movement of the armature 50 and thus the inlet valve member 46 together determine the flow rate through the inlet valve assembly 10 during its opening movement.

Figure 3:
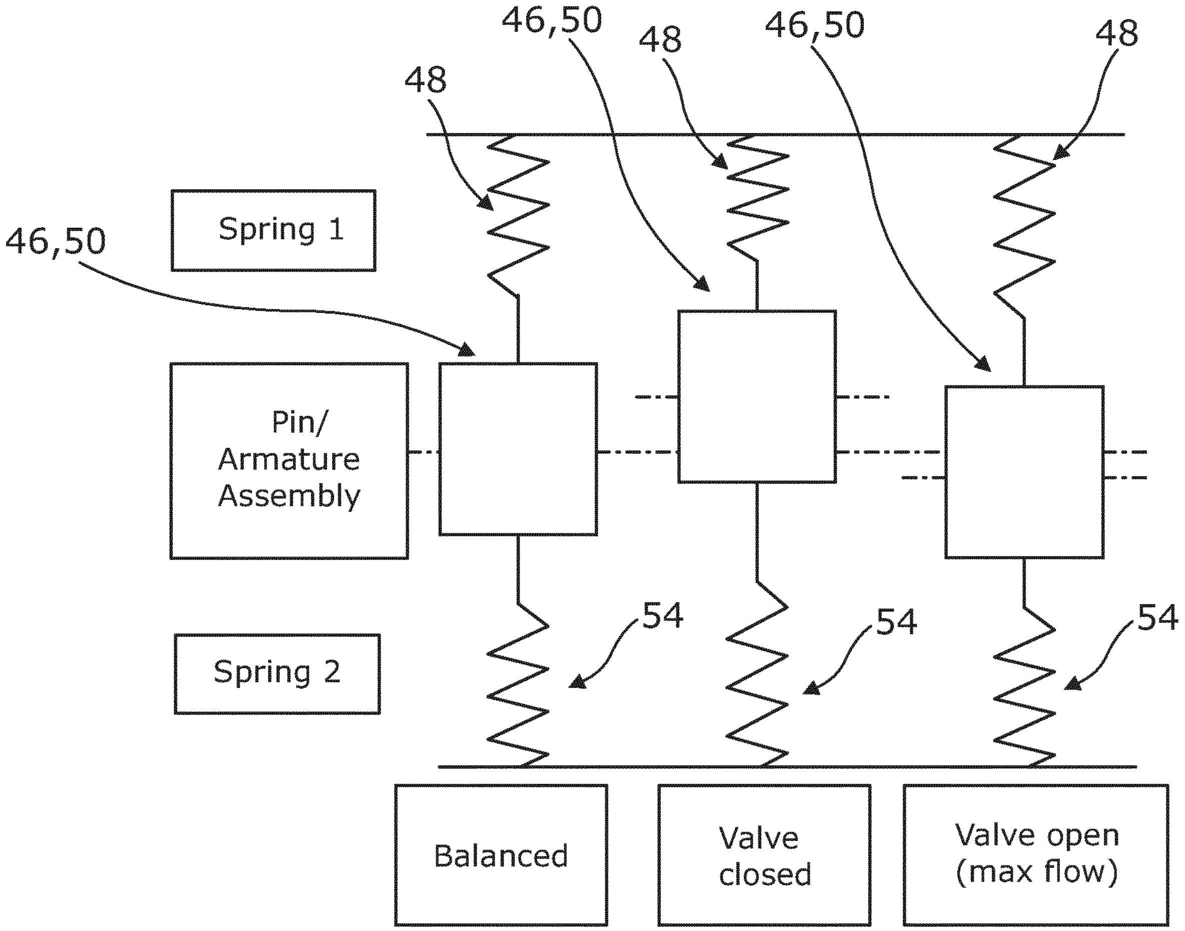
FIG. 3 illustrates the relative position of an armature and pin, or inlet valve member, of the inlet valve assembly of FIG. 1 in different states of the inlet valve assembly.

The relative position of the armature 50 and the inlet valve member 46 assembly in the fully open position of the inlet valve assembly 10 is illustrated in FIG. 3, alongside their relative positions in the closed position of the inlet valve assembly 10, and in a position in which the forces exerted on the armature 50 by the inlet valve spring 48 and the damping spring 54, in the absence of hydraulic forces caused by movement of the plunger 16, are balanced.

In embodiments in which the damping spring 54 is a progressive rate spring, the damping spring 54 advantageously becomes stiffer as it compresses, thus exerting a progressively greater force on the armature 50 as it approaches its fully open position. In this way, the damping spring 54 may exert a variable force on the armature 50 as it moves from its closed position to its open position.

In all examples, the damping spring 54 brings the armature 50 to a stop in a well controlled manner, and without the need for a hard, mechanical stop or additional hydraulic damping mechanisms.

In known systems, such a mechanical stop is provided to limit movement of the armature and inlet valve member assembly in the opening direction. The mechanical stop of known systems may take the form of a lift stop 96.

Figure 4:
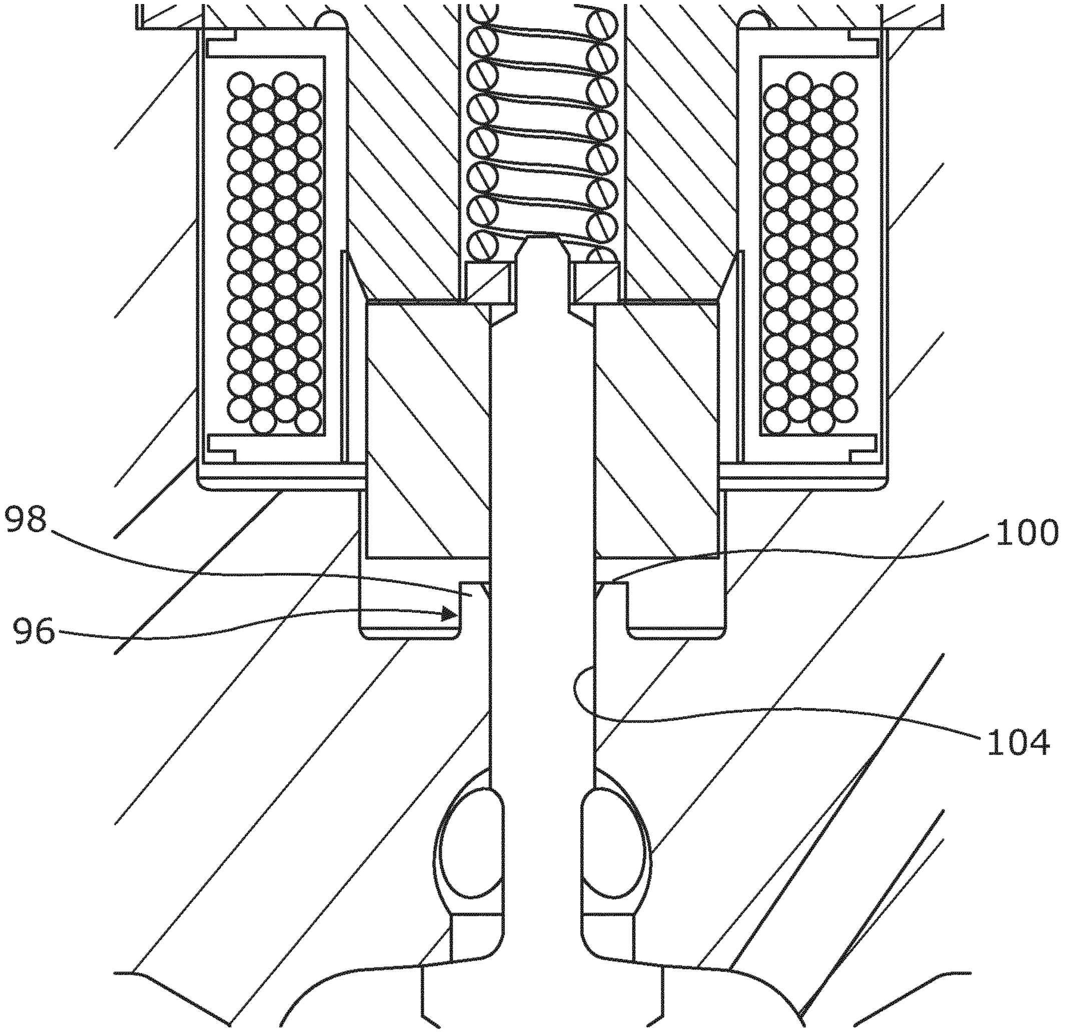
FIG. 4 is an enlarged cross sectional view of a portion of a high pressure pump element incorporating an inlet valve assembly provided with a mechanical stop for limiting downward movement of an armature and inlet valve member assembly in accordance with the prior art.

FIG. 4 shows such a lift stop 96 included in an inlet valve assembly similar to that shown in FIGS. 1 and 2, but without the damping spring 54. Like reference numerals are used for like features across FIGS. 1, 2 and 4.

The lift stop 96 is provided at the lower end 84 of the armature-receiving chamber 80 and comprises a protrusion 98 that extends upwardly from the lower surface 90 of the chamber 80, and around the body 58 of the inlet valve member 46 to form a circumferential shelf. The protrusion 98 is a cylindrical projection and is dimensioned such that a clearance exists between an upper, abutment, surface 100 of the lift stop 96 and the lower face 74 of the armature 50 when the inlet valve member 46 is in the closed position as shown in FIG. 4. In the open position of the inlet valve member 46 (not shown), the lower face 74 of the armature 50 abuts the abutment surface 100 of the lift stop 96. In this way, the lift stop 96 provides a mechanical stop that limits movement of the armature 50 in the first direction, $d_1$.

A disadvantage of the inlet valve assembly of FIG. 4 is that movement of the armature 50 in the first direction, $d_1$, is stopped abruptly by impact with the lift stop 96 on opening of the inlet valve assembly. This clash can result in impact damage to one or both of the armature 50 and the lift stop 96, especially due to the high velocity of the armature 50 on impact with the lift stop 96.

Thus, in known systems, damage may occur to components of the inlet valve assembly on opening, and repeated opening of the inlet valve assembly during operation may cause repeated damage, and eventually lead to failure or reduced performance of the inlet valve assembly. In addition to the direct damage caused to the components involved in these metal on metal clashes, these impacts may also result in damage to further components caused by floating or free material removed from these components during the clash, which May subsequently impact on other components during further operation.

Another problem that can result in a system such as that of FIG. 4 is that the head 56 of the inlet valve member 46 may strike the valve seat 62 with such a force as to result in impact damage to these components when the inlet valve assembly moves from its open position to its closed position. This issue can be addressed in embodiments of the invention by adjusting the configuration and/or arrangement of the inlet valve spring 48 and the damping spring 54. For example, the inlet valve spring 48 and the damping spring 54 may be configured and arranged such that the damping spring 54 exerts a force on the armature in the first direction when the armature 50 is nearing its closed position. In this way, the damping spring 54 could be used to control the armature 50 and inlet valve member 46 during at least a final part of their movement from their open positions to their closed positions, thereby reducing the velocity with which the inlet valve member 46 strikes the valve seat 62. One way in which this could be achieved would be to arrange the damping spring 54 such that it is slightly extended when the armature 50 is in its closed position. In that case, the damping spring 54 would also act to initially pull the armature 50 from its closed position in the opening direction, $d_1$, when the solenoid 52 is de-energised to open the inlet valve assembly 10.

Another disadvantage of known systems such as that shown in FIG. 4 is that they usually use close clearances between the outer surface 76 of the armature 50 and the inner side surface 86 of the chamber 80, and between the body 58 of the inlet valve member 46 and an inner surface 104 of the inlet valve bore 60, to dampen movement of the components of inlet valve assembly. However, this is not sufficient to provide the level of damping needed to significantly reduce the impact of clashes between components of the inlet valve assembly, and furthermore may create secondary issues such as cavitation erosion. The inlet valve assembly 10 of the invention advantageously allows for movement of components of the inlet valve assembly 10 to be controlled during opening and closing by a combination of first and second biasing means in the form of the inlet valve spring 48 and the damping spring 54, thereby removing or reducing the need for such tight clearance to provide damping and reducing the risk of cavitation.

The damping spring 54 therefore advantageously provides a means to control the velocity profile of the armature 50 and the inlet valve member 46 of the inlet valve assembly 10 during at least a portion of their travel between their closed and open positions, thereby guarding against detrimental and damaging metal on metal clashes. In the inlet valve assembly 10 of the invention, the armature 50 and the inlet valve member 46 are brought to a controlled stop over a stopping distance in the range of 1 mm to 1.5 mm, rather than being brought to an abrupt stop when striking a hard mechanical stop. It should be noted that the typical valve movement in prior art arrangements that utilise a hard mechanical stop to limit valve movement may be on the order of 0.5 mm. As such, the inlet valve assembly 10 of the invention advantageously allows for a greater clearance between the inlet valve member 46 and the valve seat 62 in the open position of the inlet valve assembly 10, thereby potentially allowing for greater fuel flow through the inlet valve assembly 10 compared to prior art arrangements.

A lift stop 96 such as that shown in FIG. 4 is not required in an inlet valve assembly 10 of the invention, allowing the inlet valve member 46 to open further such that flow into the pump chamber through the inlet valve assembly 10 can be increased. However, it should be noted that in some embodiments a lift stop 96 may be included in the arrangement of the inlet valve assembly 10 to ensure that the armature 50 does not travel past a position in the chamber 80 at which the solenoid 52 can properly act on the armature 50 when energised. In that case, inlet valve assembly 10 will be configured such that the damping spring 54 stops the armature 50 before it strikes the lift stop 96, or at least such that it significantly slows the armature 50 before it strikes the lift stop 96 to minimise the risk of damage caused by the clash.

Turning now back to the invention, in order to close the inlet valve assembly 10 once the plunger 16 has reached its BDC position at the end of the intake stroke, the solenoid 52 is energised. The magnetic field generated by the energised solenoid 52 acts to pull the armature 50 and attached inlet valve member 46 upwards in the second direction, $d_2$, towards the upper end 82 of the chamber 80, against the biasing force of the inlet valve spring 48. During the pump stroke, it will be understood that the pressure in the pump chamber 18 will act to exert a force on the head 56 of the inlet valve member 46 in the second direction, $d_2$, thus pushing the inlet valve member 46 towards its closed position.

It will be appreciated by a person skilled in the art that the invention could be modified to take many alternative forms to that described herein, without departing from the scope of the appended claims.

REFERENCED USED pump 8
inlet valve assembly 10
pump housing 12 plunger bore 14
longitudinal axis of the pump 15
plunger 16
upper surface of the plunger 17
pump chamber 18
inlet passages 20
pump chamber inlet region 22 upper end of the pump chamber 24
pump chamber outlet 26
outlet valve assembly 30
outlet passage 32
first end of outlet passage 34
second end of the outlet passage 36
pump outlet 38
outlet valve member 40
outlet valve spring 42
inlet valve member 46
inlet valve spring 48
armature 50
solenoid 52
damping spring 54
inlet valve member head 56
inlet valve member body 58
inlet valve bore 60
valve seat 62
inner surface of the pump chamber 64
tip region of the inlet valve member 66
spring plate 68
opening in the spring plate 70
cylindrical body of armature 71
upper face of armature 72
lower face of armature 74
outer surface of armature 76
armature bore 78
armature-receiving chamber 80
upper end of chamber 82
lower end of chamber 84
inner side surface of the chamber 86
opening of the damping spring 88 lower surface of the chamber 90
upper surface of the chamber 92
solenoid coils 94
lift stop 96
protrusion 98
abutment surface of armature 100
inner surface of inlet valve bore 104

The invention claimed is:

1. An inlet valve assembly of a fluid pump of an internal combustion engine, the inlet valve assembly comprising:

an inlet valve member that is movable between a closed position and an open position, wherein in the closed position the inlet valve member is arranged to block a pump chamber inlet to prevent fluid from entering or exiting a pump chamber of the fluid pump through the pump chamber inlet, and wherein in the open position the inlet valve member is arranged to allow fluid to enter or exit the pump chamber through the pump chamber inlet;

an armature that is attached to the inlet valve member such that movement of the armature causes movement of the inlet valve member;

a first biasing means configured to bias the inlet valve member in a first direction, $d_1$, towards the open position, when the inlet valve member is in the closed position; and a second biasing means configured to reduce the speed of the inlet valve member when the inlet valve member is moving in the first direction, $d_1$, towards the open position, wherein the second biasing means is configured to exert a force on the inlet valve member that acts in a second direction, $d_2$, opposed to the first direction, $d_1$, during at least a portion of travel of the inlet valve member from the closed position to the open position.

2. An inlet valve assembly as claimed in claim 1, wherein the armature is suspended between the first biasing means and the second biasing means at all times.

3. An inlet valve assembly as claimed in claim 1, wherein the second biasing means is configured to bias the armature in the second direction, $d_2$, opposed to the first direction, such that the inlet valve member attached to the armature is also biased in the second direction, $d_2$.

4. An inlet valve assembly as claimed in claim 1, wherein the second biasing means is in contact with the armature.

5. An inlet valve assembly as claimed in claim 1, wherein the armature is generally cylindrical and comprises an opening in which the inlet valve member is received in a close fit.

6. An inlet valve assembly as claimed in claim 1, wherein the armature is housed in an armature-receiving chamber of the fluid pump, and wherein the second biasing means is arranged at one end of the armature-receiving chamber.

7. An inlet valve assembly as claimed in claim 6, wherein the second biasing means extends from a floor of the armature-receiving chamber to one end of the armature when the inlet valve member is in the closed position.

8. An inlet valve assembly as claimed in claim 6, comprising a mechanical stop at the lower end of the armature-receiving chamber.

9. An inlet valve assembly as claimed in claim 1, wherein the second biasing means is configured to limit movement of the inlet valve member in the first direction, $d_1$.

10. An inlet valve assembly as claimed in claim 1, wherein the second biasing means is a progressive rate spring.

11. An inlet valve assembly as claimed in claim 1, wherein the second biasing means is a wavy spring, a disc spring or a dome spring.

12. An inlet valve assembly as claimed in claim 1, wherein the second biasing means is arranged to surround a body of the inlet valve member.

13. An inlet valve assembly as claimed in claim 1, comprising a solenoid configured to exert a force on the armature that results in movement of the inlet valve member to the closed position.

14. A fluid pump for an internal combustion engine, the fluid pump comprising:

a pump chamber comprising a pump chamber inlet for receiving fluid into the pump chamber and a pump chamber outlet from which fluid can exit the pump chamber; and an inlet valve assembly according to claim 1.

15. A method of operating an inlet valve assembly according to claim 1, arranged at the pump chamber inlet of the fluid pump for the internal combustion engine, the method comprising: moving the inlet valve member in the first direction, $d_1$, from the closed position in which the inlet valve member is arranged to block the pump chamber inlet to prevent fluid from entering the pump chamber of the fluid pump, to the open position in which the inlet valve member is arranged to allow fluid to enter the pump chamber through the pump chamber inlet; and limiting movement of the inlet valve member in the first direction, $d_1$, by exerting the force on the inlet valve member that acts in the second direction, $d_2$, opposed the first direction, $d_1$, and increases as the inlet valve member moves in the first direction, $d_1$, to bring the inlet valve member to a controlled stop over a stopping distance.

16. A method as claimed in claim 15, wherein the variable force is exerted by a progressive rate spring.

* * * * *